United States Patent [19]

Sensui

[11] Patent Number: 5,321,248

[45] Date of Patent: Jun. 14, 1994

[54] FOCUS DETECTION APPARATUS HAVING MULTIPLE DETECTING ZONES

[75] Inventor: Takayuki Sensui, Tokyo, Japan

[73] Assignee: Asahi Kogaku Kogyo Kabushiki Kaisha, Tokyo, Japan

[21] Appl. No.: 85,137

[22] Filed: Jul. 2, 1993

Related U.S. Application Data

[63] Continuation of Ser. No. 873,100, Apr. 24, 1992, abandoned.

[30] Foreign Application Priority Data

Apr. 25, 1991 [JP] Japan ............................... 3-191344

[51] Int. Cl.$^5$ .............................................. G01J 1/20
[52] U.S. Cl. .................................. 250/201.8; 354/407
[58] Field of Search ............... 250/201.2, 201.7, 201.8, 250/204, 208.1; 354/402, 406, 407, 408, 409

[56] References Cited

U.S. PATENT DOCUMENTS

| Re. 31,370 | 9/1983 | Mashimo et al. | 354/230 |
|---|---|---|---|
| Re. 32,652 | 4/1988 | Nakamaura | 250/201.8 |
| 2,922,351 | 4/1956 | Hering | 354/402 |
| 3,691,922 | 9/1972 | Konig et al. | 354/404 |
| 4,047,187 | 9/1977 | Mashimo et al. | 354/407 |
| 4,083,056 | 4/1978 | Nakamura et al. | 354/407 |
| 4,171,155 | 10/1979 | Jyoujiki et al. | 354/407 |
| 4,183,642 | 1/1980 | Fukuoka | 354/402 |
| 4,223,988 | 9/1980 | Jyoujiki et al. | 354/407 |
| 4,307,947 | 12/1981 | Jyoujiki | 354/406 |
| 4,333,716 | 6/1982 | Sakane et al. | 354/402 |
| 4,459,004 | 7/1984 | Morizumi . | |
| 4,548,495 | 10/1985 | Suzuki | 356/123 |
| 4,560,863 | 12/1985 | Matsumura et al. | 250/201.2 |
| 4,563,576 | 1/1986 | Matsumura et al. | 250/204 |
| 4,574,314 | 3/1986 | Weinblatt | 358/227 |
| 4,636,624 | 1/1987 | Ishida et al. . | |

(List continued on next page.)

FOREIGN PATENT DOCUMENTS

| 55338 | 7/1982 | European Pat. Off. . |
|---|---|---|
| 0402828 | 12/1990 | European Pat. Off. . |
| 1211815 | 3/1966 | Fed. Rep. of Germany . |
| 3505864 | 8/1985 | Fed. Rep. of Germany . |
| 3803305 | 8/1988 | Fed. Rep. of Germany . |
| 2382056 | 9/1978 | France . |
| 59-126517 | 7/1984 | Japan . |
| 60-32012 | 2/1985 | Japan . |
| 60-41013 | 3/1985 | Japan . |
| 61-113017 | 5/1986 | Japan . |
| 62-47612 | 3/1987 | Japan . |
| 62-189415 | 8/1987 | Japan . |
| 1155308 | 6/1989 | Japan . |
| 258012 | 2/1990 | Japan . |
| 2120712 | 5/1990 | Japan . |
| 2130041 | 5/1984 | United Kingdom . |
| 2183419 | 6/1987 | United Kingdom . |
| 2213602 | 8/1989 | United Kingdom . |
| 8701571 | 3/1987 | World Int. Prop. O. . |

OTHER PUBLICATIONS

Patent Abstracts of Japan, vol. 10, No. 294 (P-504), Oct. 7, 1986.

(List continued on next page.)

Primary Examiner—David C. Nelms
Assistant Examiner—John R. Lee
Attorney, Agent, or Firm—Sandler, Greenblum & Bernstein

[57] ABSTRACT

A focus detecting apparatus, characterized in that it comprises, multiple detecting zones situated in a focal plane, an orientation changing mechanism which changes the orientations of images formed in these zones, an image separating device which separate these images into image pairs, and multiple sensors, having a different positional relationship to that of the multiple detecting zones, which detect the image pairs.

32 Claims, 21 Drawing Sheets

U.S. PATENT DOCUMENTS

| | | | |
|---|---|---|---|
| 4,716,431 | 12/1987 | Shindo | 354/407 |
| 4,768,052 | 8/1988 | Hamada et al. | 354/402 |
| 4,786,934 | 11/1988 | Kunze et al. | 354/409 |
| 4,843,415 | 6/1989 | Matsui | 354/403 |
| 4,857,720 | 8/1989 | Karasaki et al. | 250/201.2 |
| 4,859,842 | 8/1989 | Suda et al. | 250/201.8 |
| 4,908,504 | 3/1990 | Karasaki et al. | 250/201.2 |
| 4,949,116 | 8/1990 | Karasaki et al. | 354/408 |
| 4,950,879 | 8/1990 | Ishida et al. | 250/201.8 |
| 4,952,966 | 8/1990 | Ishida et al. | 354/406 |
| 4,954,701 | 9/1990 | Suzuki et al. | 250/201.8 |
| 4,978,988 | 12/1990 | Karasaki | 354/406 |
| 4,992,818 | 2/1991 | Karasaki et al. | 354/407 |
| 5,017,005 | 5/1991 | Shindo | 356/125 |
| 5,121,152 | 6/1992 | Wagner | 354/402 |
| 5,137,350 | 8/1992 | Misawa et al. | 356/1 |
| 5,138,359 | 8/1992 | Nagano et al. | 354/406 |
| 5,206,498 | 4/1993 | Sensui | 250/208.1 |

OTHER PUBLICATIONS nique, Optical Engineering, Jul./Aug. 1974, pp. 339-342.

G. Schroeder, Techische Optik Kurz und bunding, Vogel-Verlag 1974, p. 41, and English translation.

United Kingdom Search Report.

Patent Abstracts of Japan, vol. 8, No. 219 (P-306), Oct. 5, 1984.

English Language Translation of German Office Action.

French Search Report and Annex.

Japanese Abstracts of Japan, vol. 14, No. 341, Jul. 24, 1990 and JP-A-02-120,712.

French Search Report and Annex, Aug. 6, 1993.

Mitsuo Ikeda, Psychological Physics of Vision, (1975), with English Translation of portions thereof.

Fixation Point Measurement by the Oculometer Tech- $\Delta Y = \Delta H$ $\Delta Y \neq \Delta H$

FOCUS DETECTION APPARATUS HAVING MULTIPLE DETECTING ZONES

This application is a continuation of application Ser. No. 07/873,100, filed Apr. 24, 1992, now abandoned.

BACKGROUND OF THE INVENTION

1. Field of the Invention

The present invention relates to a focus detection apparatus which detects the focusing status of a photographic lens with respect to an object within multiple zones of a picture to be photographed.

2. Description of the Prior Art

In the prior art, an apparatus is known wherein a zone of an image in the center of a picture to be photographed is separated into an image pair onto line sensors, and the focusing status of the lens is detected according to an output difference of these sensors, as described in Japanese Laid-Open Publication No. SHO 59-126517.

This conventional apparatus however can detect only the focusing status of a lens with respect to an object in the center of the picture, and a focus lock method has to be used for objects on a periphery.

Japanese Laid-Open Publications Nos. HEI 1-15308 and HEI 2-58012 disclose apparatuses wherein multiple focal point detecting zones are provided in a focal plane, and multiple images in these zones are separated on multiple line sensors.

It is desirable, to reduce the effect of vignetting of the photographic lens, that the detection zones on the periphery of the focal plane are arranged in the sagittal direction perpendicular to a radial direction of the photographic lens. On the other hand, if the sensors in the reimaging plane can be arranged in a straight line, it is then possible to employ only one sensor divided into multiple parts. There are therefore different requirements regarding the arrangement of detection zones and sensors. In the prior art, however, these positional relationships were set and could not be changed.

SUMMARY OF THE INVENTION

In view of the aforesaid problems in the prior art, it is an object of the invention to provide a focus detecting apparatus wherein line sensors on the sensor unit can be freely arranged independently of the arrangement of detecting zones in a focal plane.

To achieve the aforesaid objects, the focus detecting apparatus of this invention is therefore characterized in that it comprises multiple detecting zones situated in a focal plane, orientation changing means which change the orientation of images formed in these zones, image separating means which separate these images into image pairs, and multiple sensors having a different positional relationship to that of the multiple zones which detect these image pairs.

DETAILED DESCRIPTION OF THE EMBODIMENTS

The embodiments of the present invention will now be described with reference to the drawings. The present disclosure relates to subject matter contained in Japanese Patent Application No. Hei 3-191344 (filed on Apr. 25, 1991) which is expressly incorporated herein by reference in its entirety.

Embodiment 1

FIGS. 1 to 4 show a first embodiment of the focus detecting apparatus according to this invention.

Figure 1:
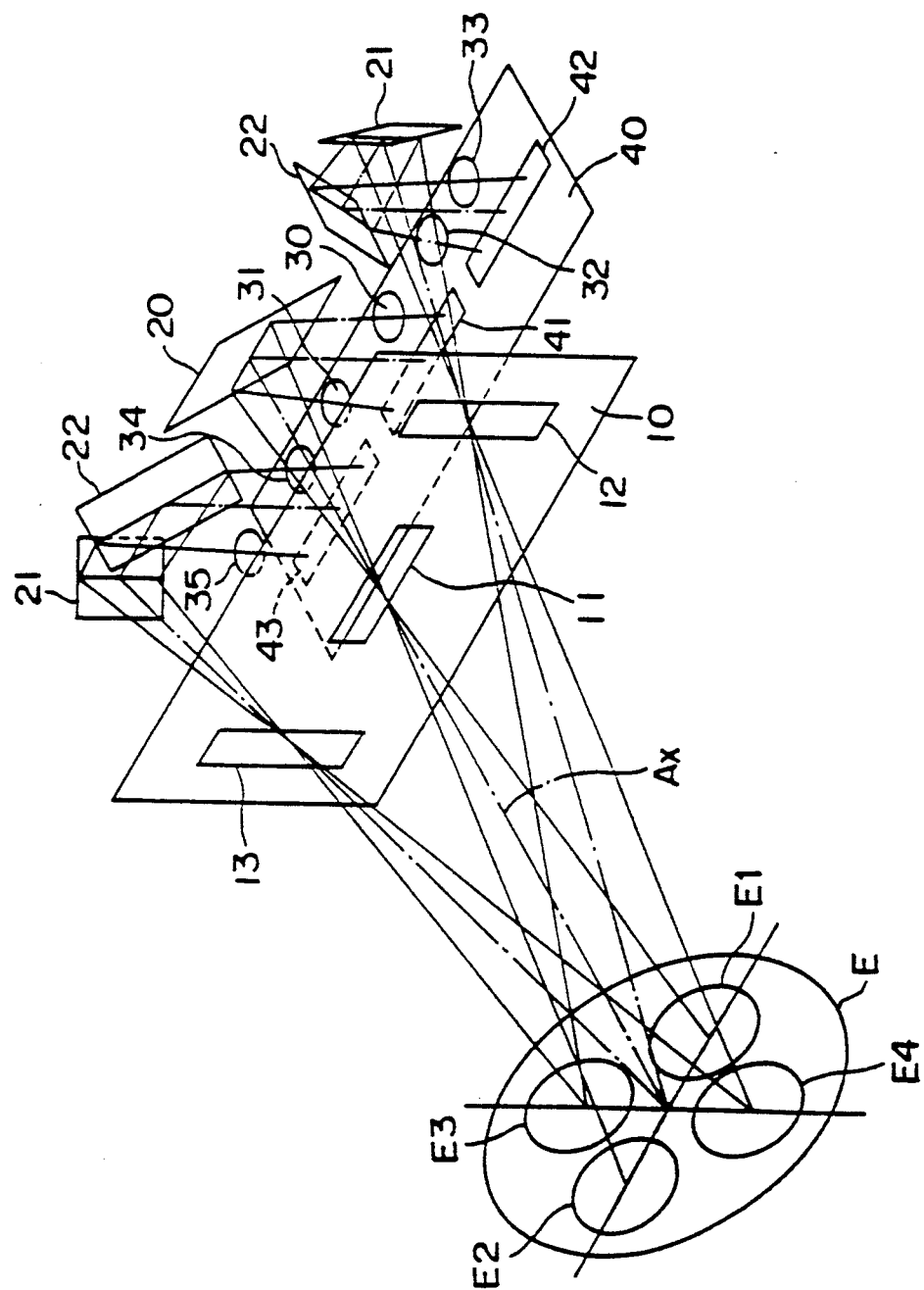
FIG. 1 is a perspective view of an optical system of a focus detecting apparatus according to a first embodiment of this invention.
Figure 2:
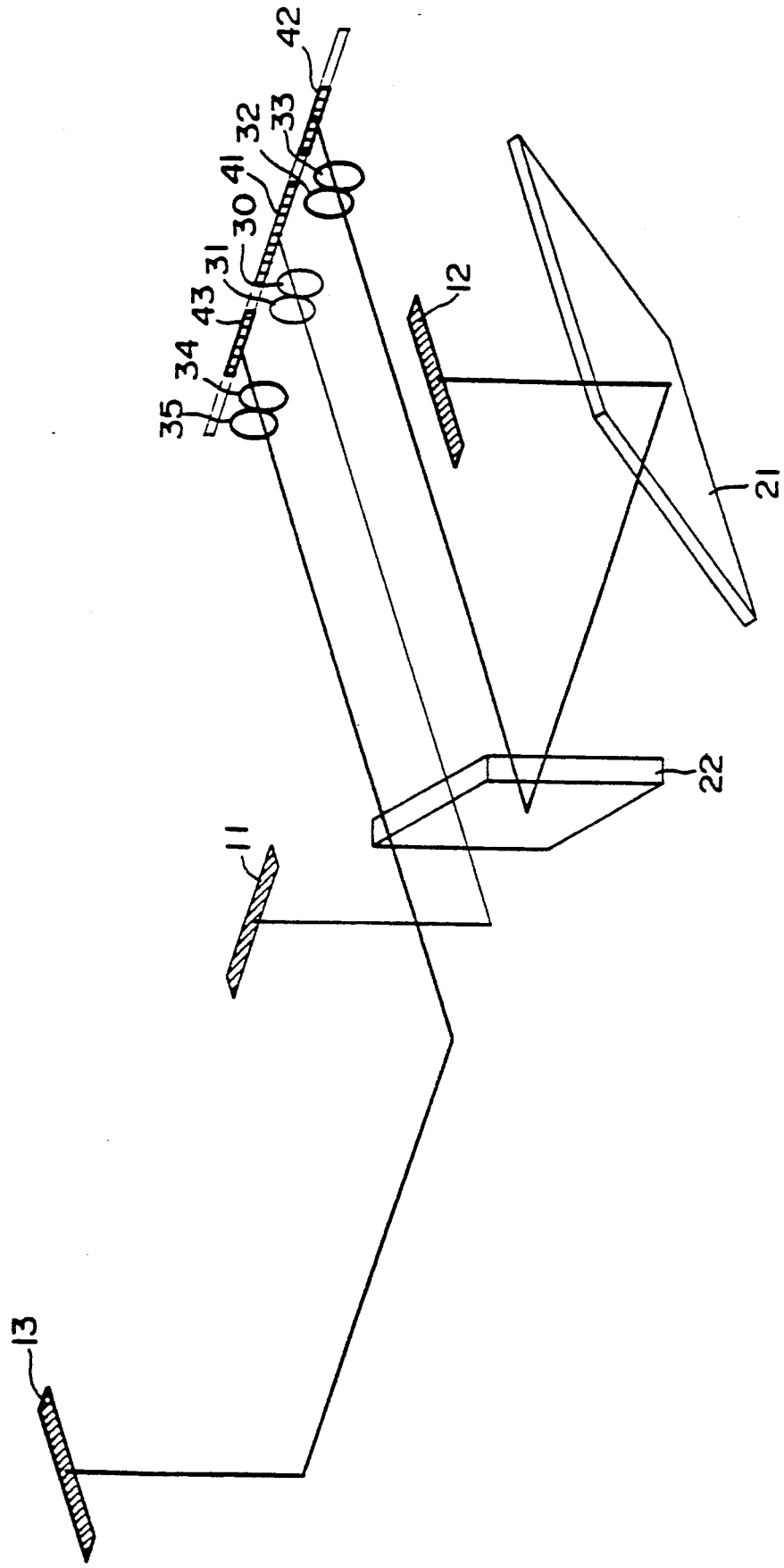
FIG. 2 is a perspective view showing essential parts of the apparatus shown in FIG. 1.

As shown in FIG. 1 and FIG. 2, a visual field mask 10 for extracting parts of an object to be photographed is disposed in the vicinity of a focal plane in which an image of an object is formed by a photographic lens. On this mask 10, three focus detecting zone openings 11, 12, 13 are formed which determine the visual field of the focus detecting system.

The focal plane is disposed in an optically conjugate position to a film if the focus detecting apparatus is used in a photographic camera, and to an image sensor if it is used in an electronic camera. This plane is also in an optically conjugate relation to a focusing screen in the optical finder system of the camera, not shown.

The focus detecting zones comprise a central detecting zone 11 on an optic axis of the photographic lens, and two peripheral detecting zones 12, 13 oriented parallel to the sagittal direction of the lens and perpendicular to the longitudinal direction of the central zone 11.

A light beam which has passed through two regions E1, E2 arranged horizontally on pupil E of the photographic lens and through the central detecting zone 11 is deflected through 90° by a first mirror 20, and separated by a pair of separating lenses 30, 31 so as to form an image pair on a line sensor 41 of a sensor unit 40 disposed in a reimaging plane. The pupils of these separator lenses are in optically conjugate positions to the pupil E of the photographic lens.

Light beams which have passed through two regions E3, E4 arranged vertically on pupil E and through the peripheral detecting zones 12, 13 are each deflected through 90° in turn by second and third mirrors 21, 22 so as to change the orientation of the images, and the resulting images are each separated by pairs of separating lenses 32, 33, and 34, 35 so as to form image pairs on line sensors 42, 43.

Since the optical path length between the center zone 11 and the sensor 41 is different from that between the peripheral zones 12, 13 and the sensors 42, 43, separating lenses of different focal lengths are used.

Focusing areas in the image finder corresponding to the focus detecting zones in the focal plane are provided for the convenience of the user to observe the focus detecting zones. A focus detecting circuit detects the focusing status of the photographic lens using the outputs of the line sensors corresponding to the object selected by the user or by a camera circuit.

Figure 3:
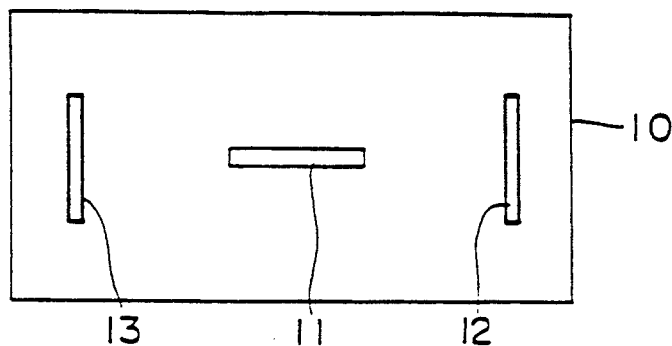
FIG. 3 is a plan view showing an arrangement of focus detecting zones in a focal plane according to the first embodiment of this invention.
Figure 4:
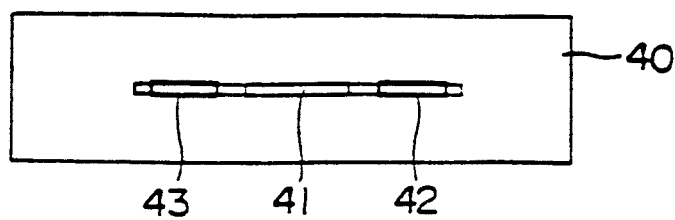
FIG. 4 is a plan view showing the arrangement of line sensors in a reimaging plane according to the first embodiment of this invention.

As the optical path is deflected by the mirrors, the central detecting zone 11 and the peripheral detecting zones 12, 13 may be arranged perpendicular to each other on the visual field mask 10 disposed in the focal plane, as shown in FIG. 3, while the line sensors 41, 42, 43 are simultaneously arranged in a straight line on the sensor unit 40, as shown in FIG. 4.

The exit pupil of the photographic lens is spherical. Orientation of the peripheral detecting zones perpendicular to the longitudinal direction of the central detecting zone therefore makes it less likely that vignetting of the lens will give rise to eclipsing. If the peripheral zones were oriented parallel to the longitudinal direction of the central zone, there is a strong possibility that the edges of the image would be eclipsed by vignetting, leading to a reduction of the amount of light from the image and making accurate focus detection difficult.

Further, by arranging the line sensors in a straight line, the focusing status of three detecting zones can be detected by a single sensor. In this case, the sensor is divided into three regions corresponding to the detecting zones and each of these regions is divided into two parts.

Figure 5:
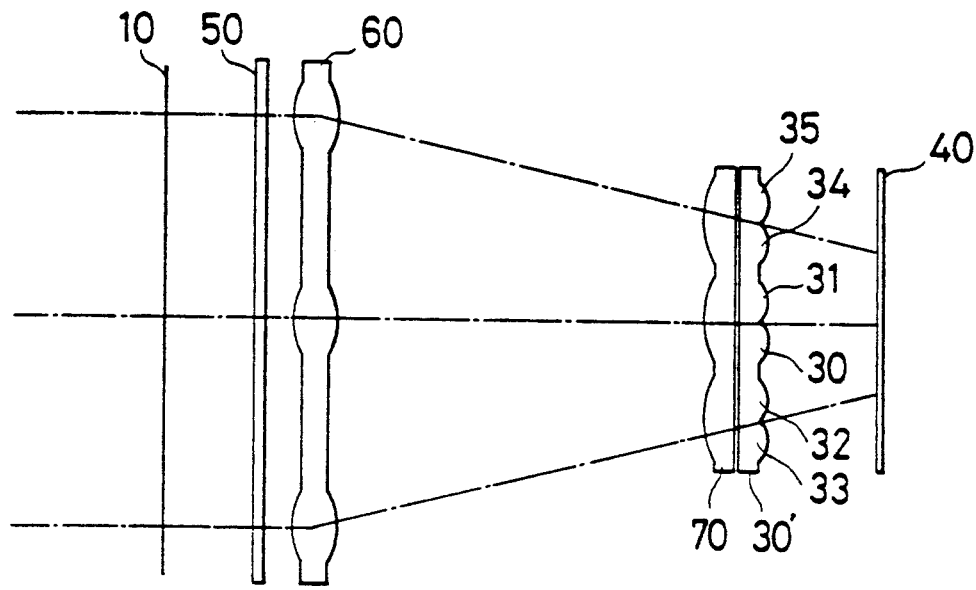
FIG. 5 is a schematic drawing showing a detailed construction of the focus detecting apparatus according to the first embodiment of this invention.

FIG. 5 shows the detailed construction of the aforesaid embodiment. All components from the visual field mask 10 to the line sensors 41, 42, 43 are assembled as a single module housed in the camera. Behind the mask 10 are arranged a cover glass 50, a condensing lens 60 which acts as a relay lens, an auxiliary lens 70, a separating lens group 30' and a sensor unit 40.

Figure 6:
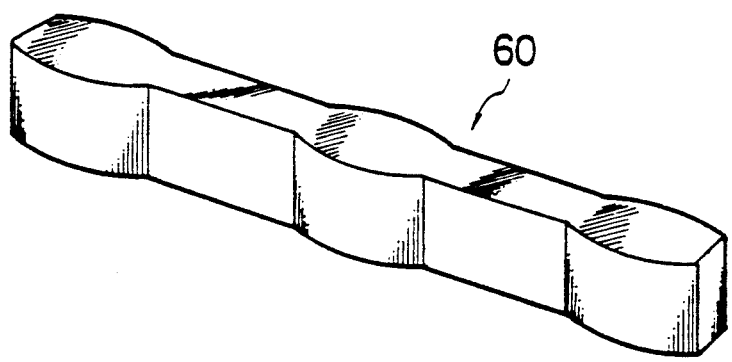
FIG. 6 is a perspective drawing of a condensing lens shown in FIG. 5.
Figure 7:
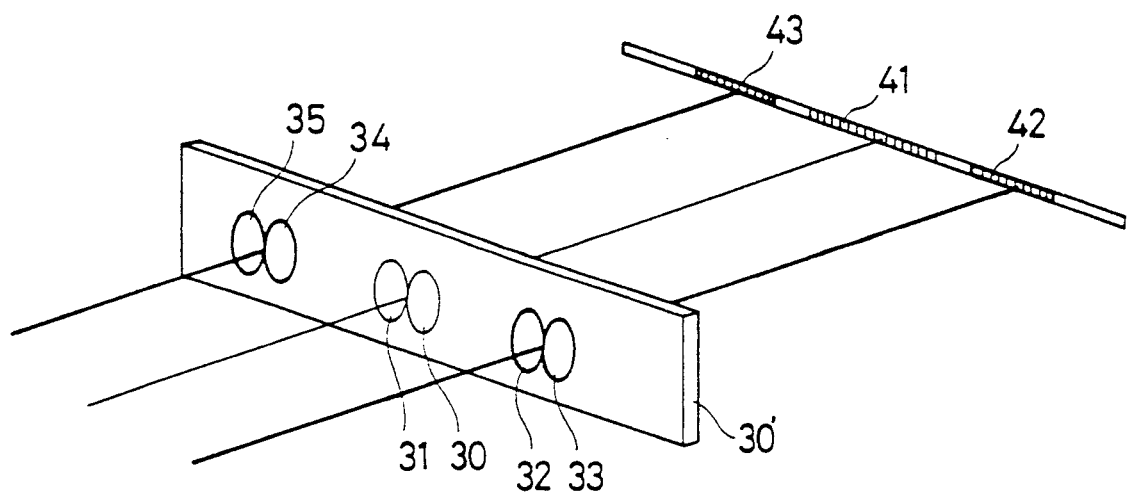
FIG. 7 is a perspective drawing of a separating lens shown in FIG. 5.

As shown in FIG. 6, convex parts of the condensing lens 60 corresponding to the three detecting zones are formed in a one-piece construction. Moreover, as shown in FIG. 7, the separating lens group 30' comprises six lenses 30 to 35 formed in a one-piece construction on a substrate.

By forming the condensing lens 60 and the separating lens group 30' in a one-piece construction, there is no need to adjust the positions of the individual lenses and the efficiency of assembly is improved.

Embodiment 2

Figure 8:
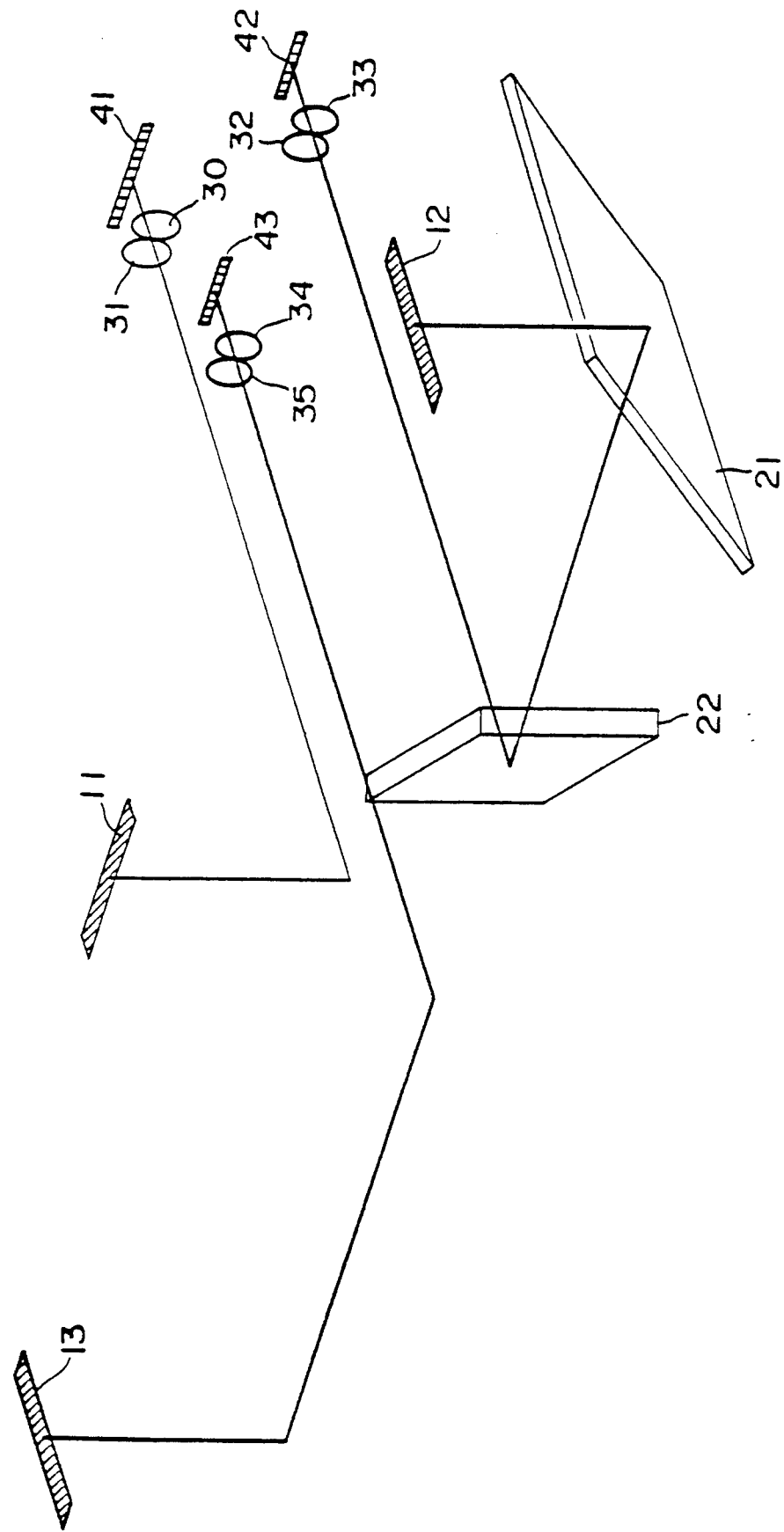
FIG. 8 is a perspective view showing essential parts of a focus detecting apparatus according to a second embodiment of this invention.
Figure 9:
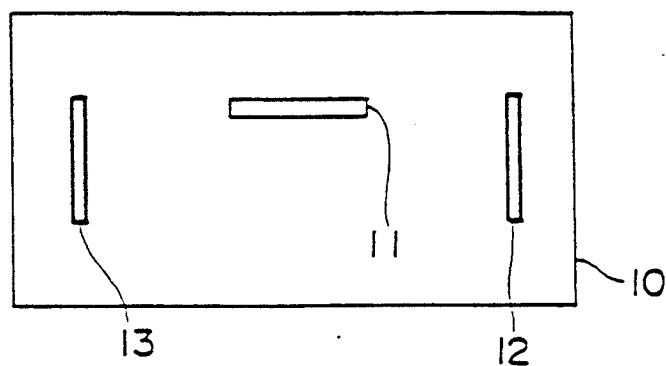
FIG. 9 is a plan view showing an arrangement of focus detecting zones in a focal plane according to the second embodiment of this invention.
Figure 10:
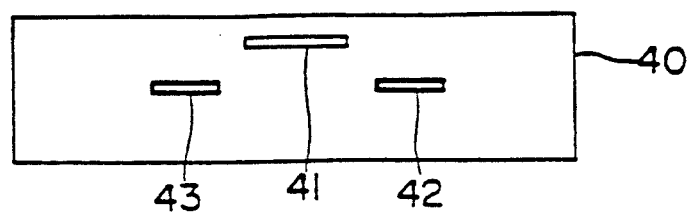
FIG. 10 is a plan view showing an arrangement of line sensors in a reimaging plane according to the second embodiment of this invention.

FIGS. 8–10 show a second embodiment of the focus detecting apparatus of this invention.

According to this embodiment, the focus detecting zones on the visual field mask 10 disposed in the focal plane comprise a central detecting zone 11 situated in a central position not intersecting with the optic axis of the photographic lens, and two peripheral detecting zones 12, 13 on either side of the central zone 11. The longitudinal direction of the central detecting zone 11 corresponds to the longitudinal direction of the focal plane 10, while the peripheral detecting zones 12, 13 are oriented perpendicular to the longitudinal direction of the central zone 11.

The sensor unit 40 of the apparatus in the reimaging plane comprises three line sensors 41, 42, 43 of which the picture elements are oriented in the same direction. Instead of these sensors being arranged in a straight line as they are in Embodiment 1. However, the central sensor is offset with respect to the other two. The remaining construction is similar to that of Embodiment 1.

As described hereintofore, according to this invention, the line sensors on the sensor unit can be freely arranged independently of the arrangement of the detecting zones in the focal plane. Optimum positional relations may therefore be selected.

Embodiment 3

FIGS. 11 to 15 show a third embodiment of the focus detecting apparatus of this invention.

According to this embodiment, there are provided three focus detecting systems in the same manner as Embodiment 1 and two focus detecting systems for detecting the focus status of the apparatus with respect to objects situated further towards the outside areas than the areas detected by said three focus detecting systems in the longitudinal direction of the focal plane.

Figure 12:
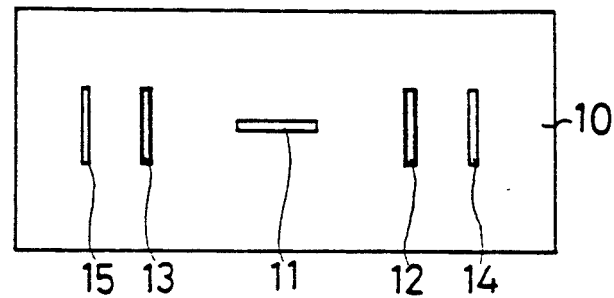
FIG. 12 is a plan view showing the arrangement of focus detecting zones in a focal plane according to the third embodiment of this invention.
Figure 13:
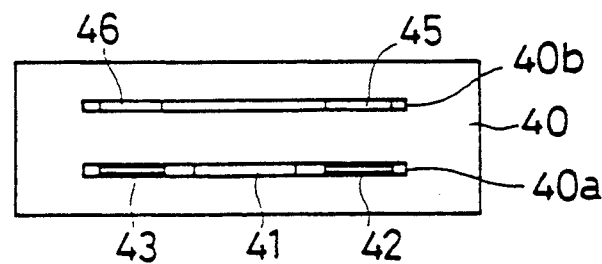
FIG. 13 is a plan view showing the arrangement of line sensors in a reimaging plane according to the third embodiment of this invention.

In this embodiment, as shown in FIG. 12, a central detecting zone 11 and two pairs of peripheral detecting zones 12 to 15 are provided on the visual field mask 10. As shown in FIG. 13, the sensor unit 40 comprises a first line sensor group 40a consisting of line sensors 41, 42, 43 for detecting light beams from the three inner detecting zones 11, 12, 13, and a second line sensor group 40b consisting of line sensors 45, 46 for detecting light beams from the two outer detecting zones 14, 15. These two line sensor groups 40a, 40b are arranged parallel to one another on the sensor unit 40.

The light beam from the inner peripheral detecting zone 12 is reflected by mirrors 21, 22, and separated by separating lenses 32, 33 so as to form image pair on the line sensor 42. The light beam from the outer peripheral detecting zone 14 is also reflected by mirrors 21, 22, and separated by separating lenses 36, 37 so as to form image pair on the line sensor 45.

Mirrors are also provided for the peripheral detecting zones 13, 15 on the reflecting side but are not shown in the drawing.

Figure 11:
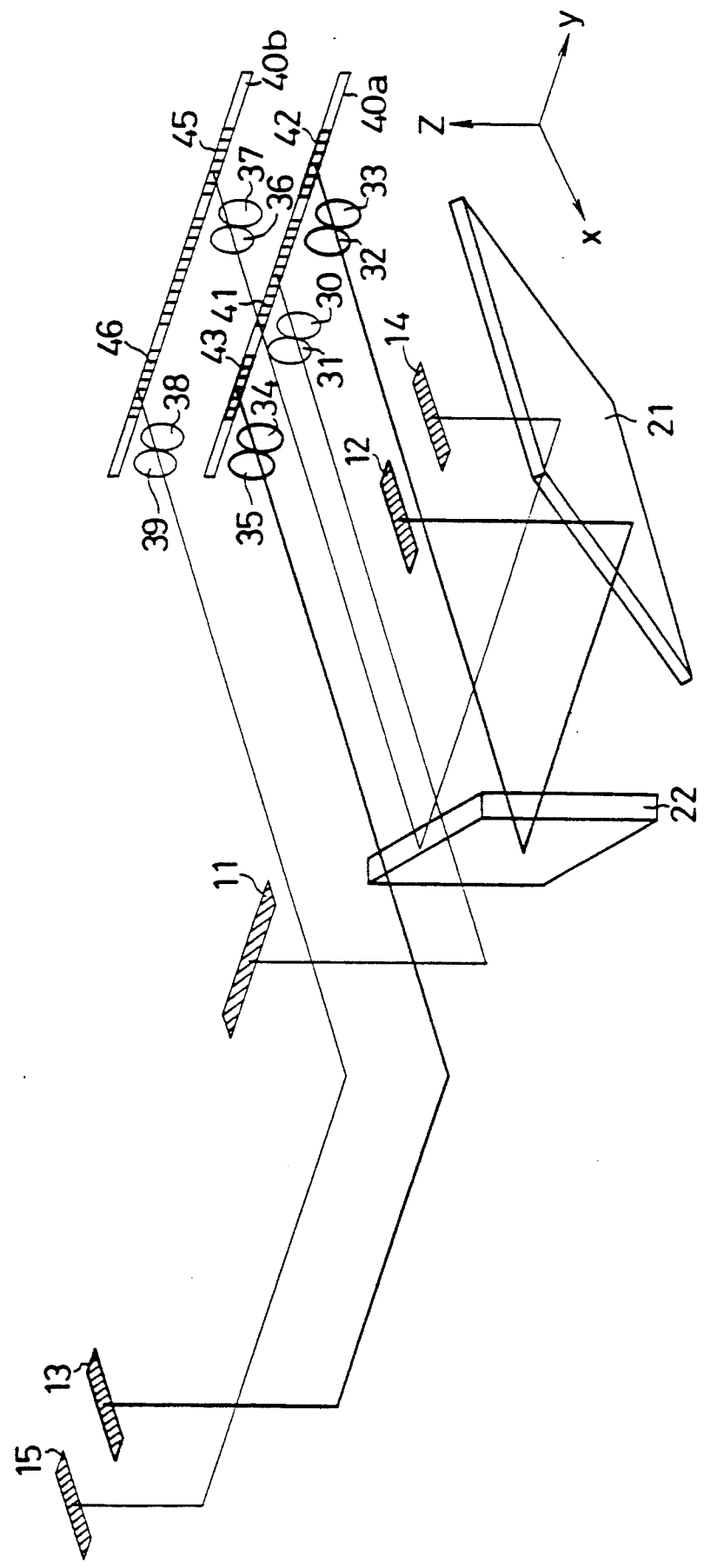
FIG. 11 is a perspective view showing essential parts of a focus detecting apparatus according to a third embodiment of this invention.
Figure 14:
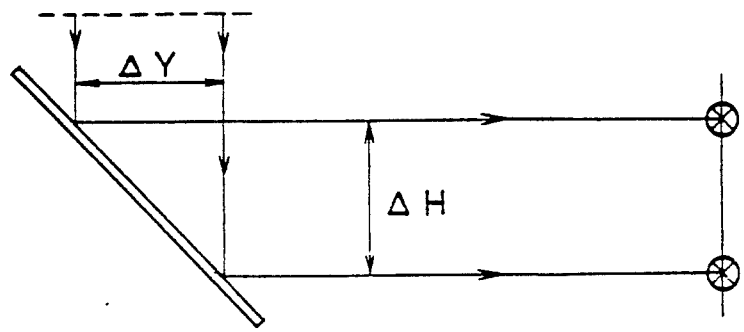
FIG. 14 is a schematic drawing of an optical path in the vicinity of the second mirror in FIG. 11.

The x-y-z axes in FIG. 11 will now be defined. The x-y plane is parallel to the visual field mask 10, and the y-z plane is parallel to the front surface of the sensor unit 40. The projection of the second mirror 21 in the y-z plane is inclined at 45° with respect to the optical paths of the light beams arriving from the detecting zones 12, 14. As shown in FIG. 14, therefore, distance $\Delta Y$ between these two light beams is equal to distance $\Delta H$ between them after they have been reflected by the mirrors 21, 22, and this interval is also the distance between the two line sensor groups 40a, 40b.

Figure 15:
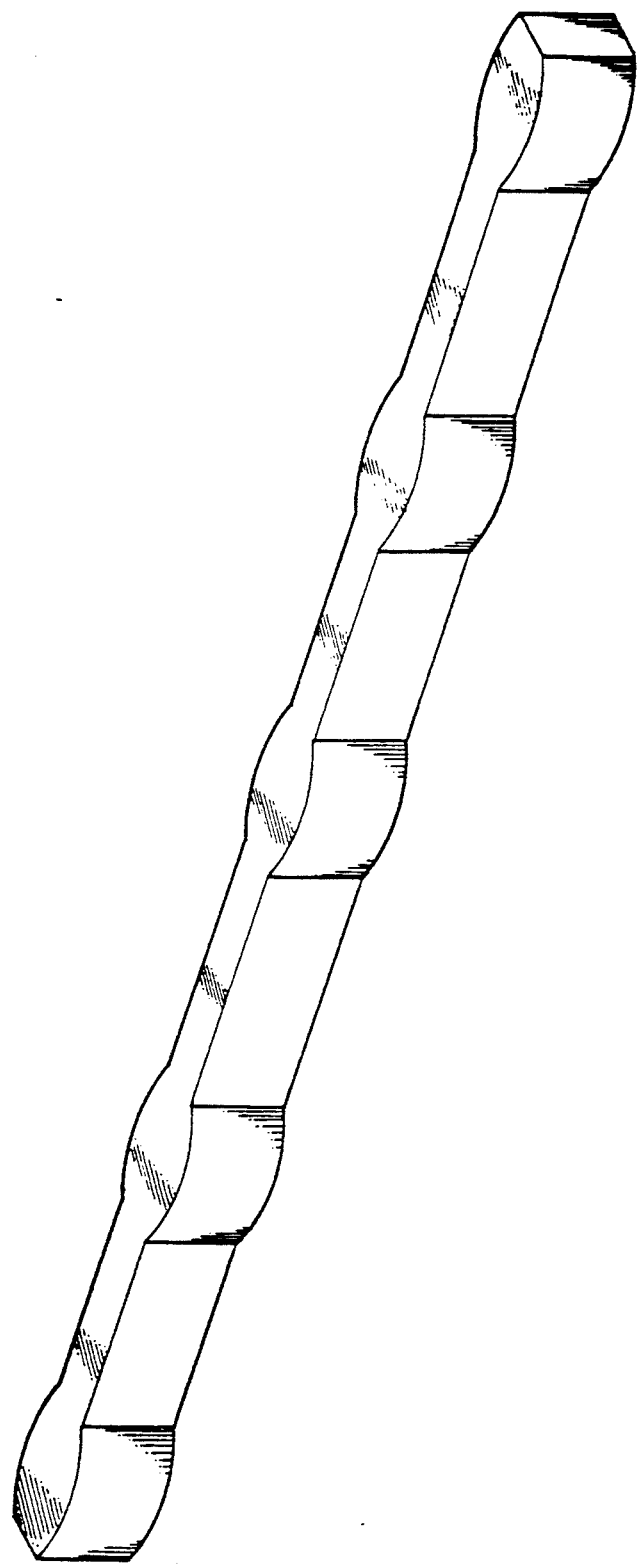
FIG. 15 is a perspective view of the condensing lens in FIG. 11.
Figure 16:
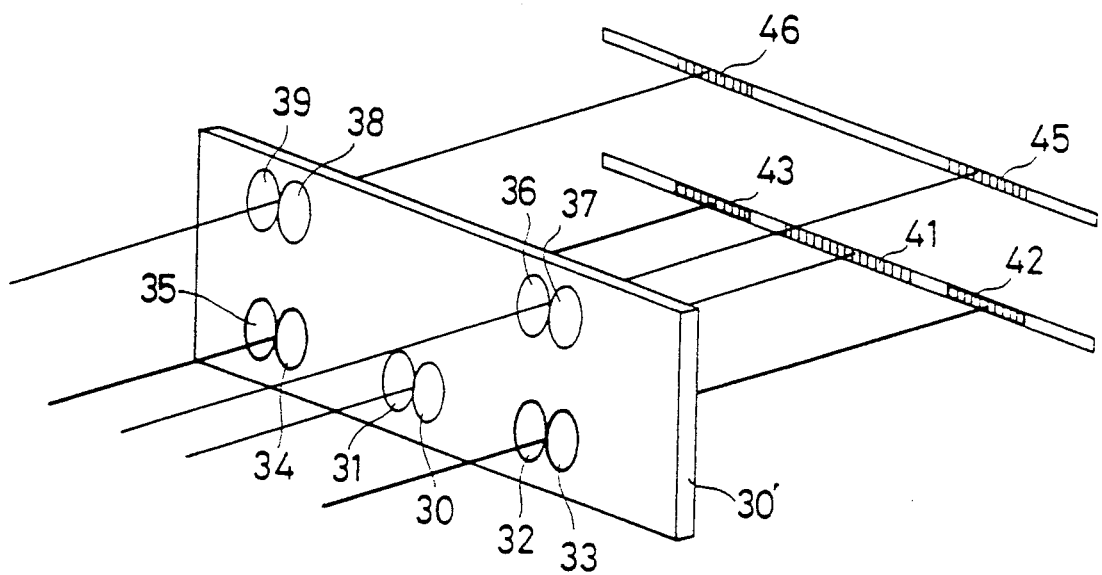
FIG. 16 is a perspective view of the separating lenses in FIG. 11.

In this embodiment, as in Embodiment 1, either or both the condensing lens and separating lens may be formed in a one-piece construction. FIG. 15 shows a condensing lens formed in a one-piece construction, and FIG. 16 shows a separating lens formed in a one-piece construction.

Embodiment 4

Figure 17:
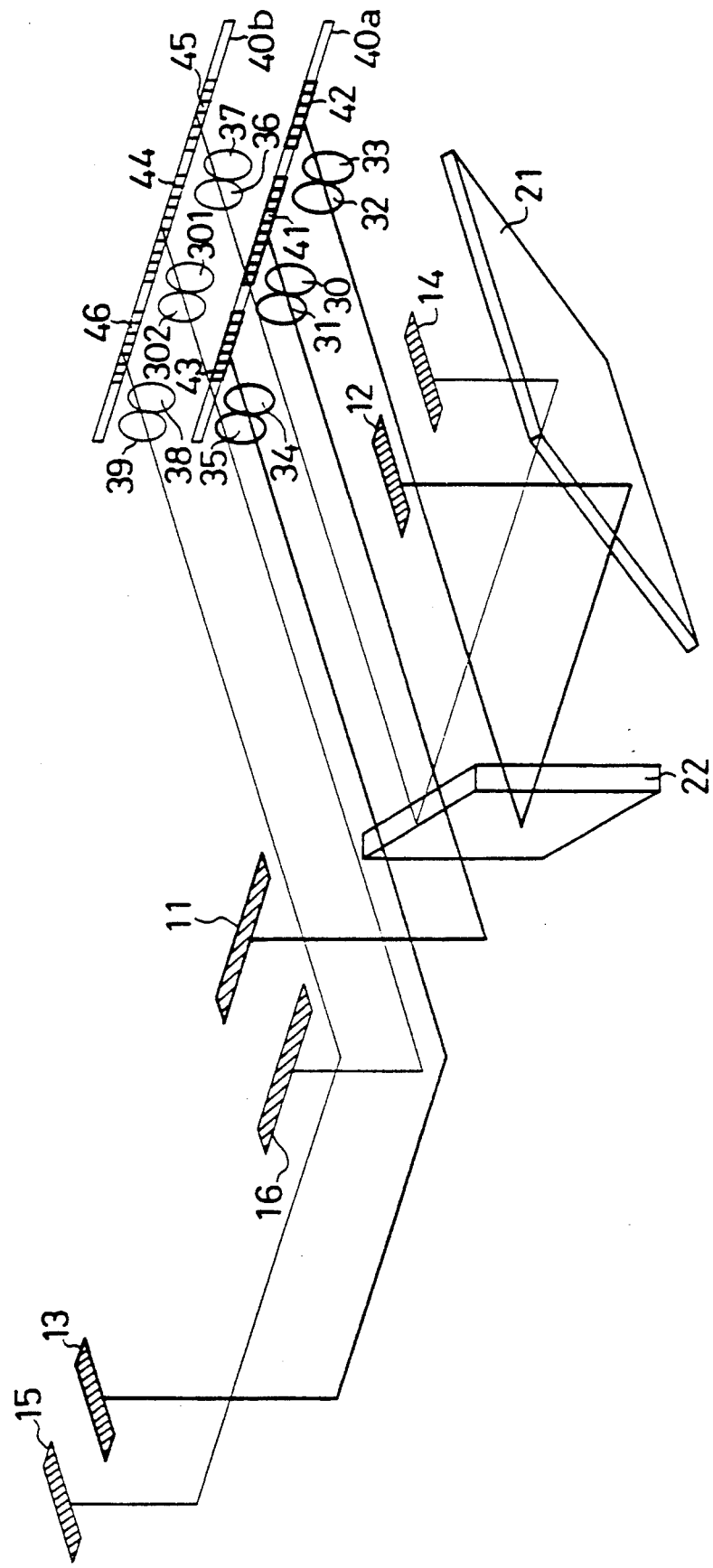
FIG. 17 is a perspective view showing the essential parts of a focus detecting apparatus according to a fourth embodiment of this invention.
Figure 18:
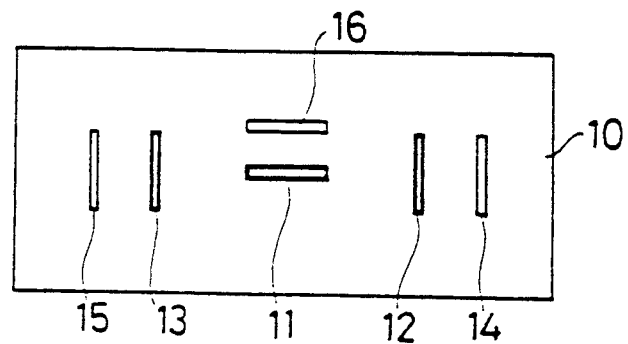
FIG. 18 is a plan view showing the arrangement of focus detecting zones in a focal plane according to the fourth embodiment of this invention.
Figure 19:
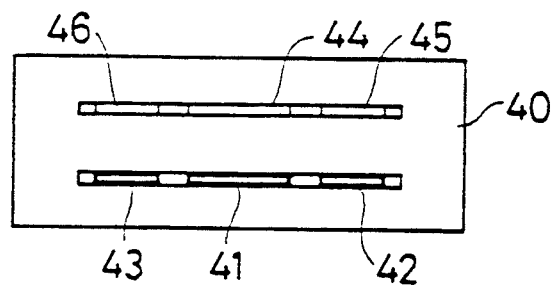
FIG. 19 is a plan view showing the arrangement of line sensors in a reimaging plane according to the fourth embodiment of this invention.
Figure 20:
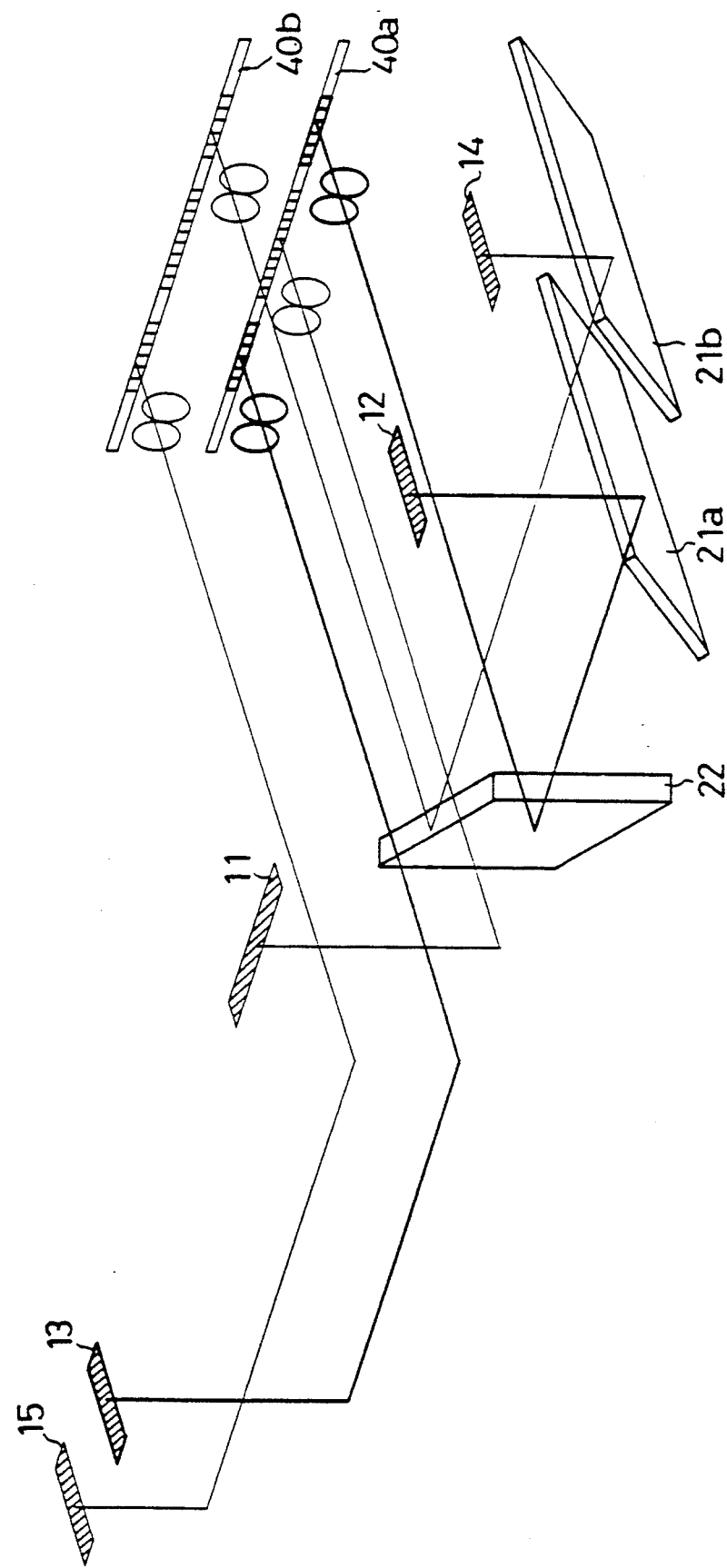
FIG. 20 is a perspective view showing the essential parts of a focus detecting apparatus according to a fifth embodiment of this invention.

FIGS. 17 to 19 show a fourth embodiment of the focus detecting apparatus of this invention. In this embodiment, two detecting zones 11, 16 are provided in the center of the picture, the remaining construction being identical to that of the aforesaid Embodiment 3. The light beam from the detecting zone 16 is reflected by a mirror, not shown, and separated by separating lenses 301, 302 so as to form images on a line sensor 44.

FIG. 18 shows the arrangement of detecting zones on the mask 10, and FIG. 19 shows the arrangement of line sensors in the sensor unit 40.

Embodiment 5

FIGS. 20 to 23 show a fifth embodiment of the focus detecting apparatus of this invention. In this embodiment, light beams from detecting zones 12, 14 on the periphery of the picture are reflected respectively by second mirrors 21a and 21b, and reflected again by a third mirror 22 so as to impinge on corresponding line sensors.

The remaining construction is the same as that of Embodiment 3 shown in FIG. 11. Further, the arrangement of detecting zones on the visual field mask and the arrangement of line sensors in the reimaging plane are substantially the same as those of the embodiment illustrated in FIG. 12 and FIG. 13.

Figure 21:
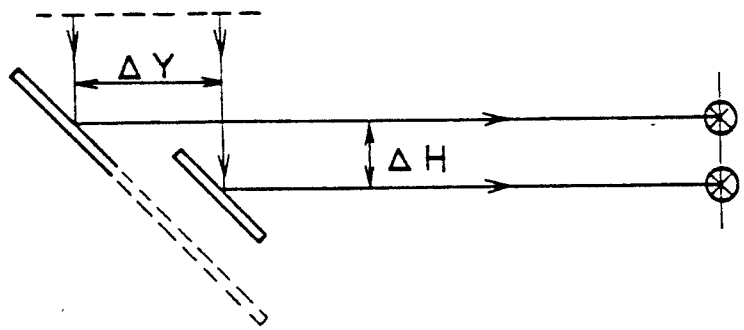
FIG. 21 is a schematic drawing of an optical path in the vicinity of the second mirror in FIG. 20.

In this embodiment, as shown in FIG. 21, the provision of two second mirrors makes it possible to set distance $\Delta H$ between the light beams arriving at the line sensors from the detecting zones 12, 14 smaller than distance $\Delta Y$ between the detecting zones 12, 14 themselves. The distance between the line sensor groups 40a and 40b can therefore be set smaller than that in Embodiment 3, and the sensor unit occupies less space.

Figure 22:
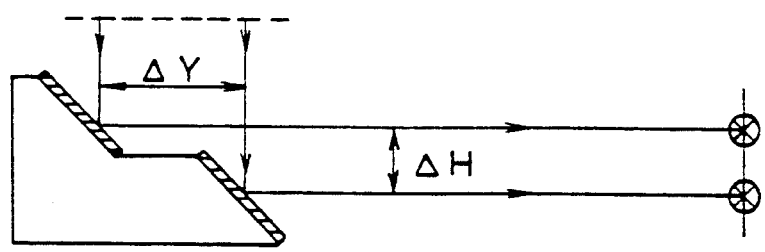
FIG. 22 is a schematic drawing illustrating one example of the second mirror in FIG. 20.
Figure 23:
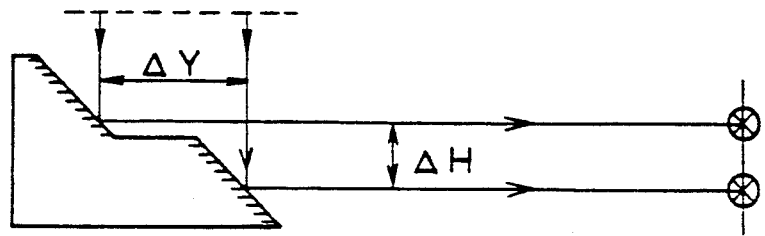
FIG. 23 is a schematic drawing illustrating a further example of the second mirror in FIG. 20.

FIG. 22 and 23 illustrate specific examples of the mirrors 21a and 21b. In the example shown in FIG. 22, the mirrors are respectively attached to staggered inclined surfaces, while in the example shown in FIG. 23, the mirrors are coated onto staggered inclined surfaces.

Embodiment 6

Figure 24:
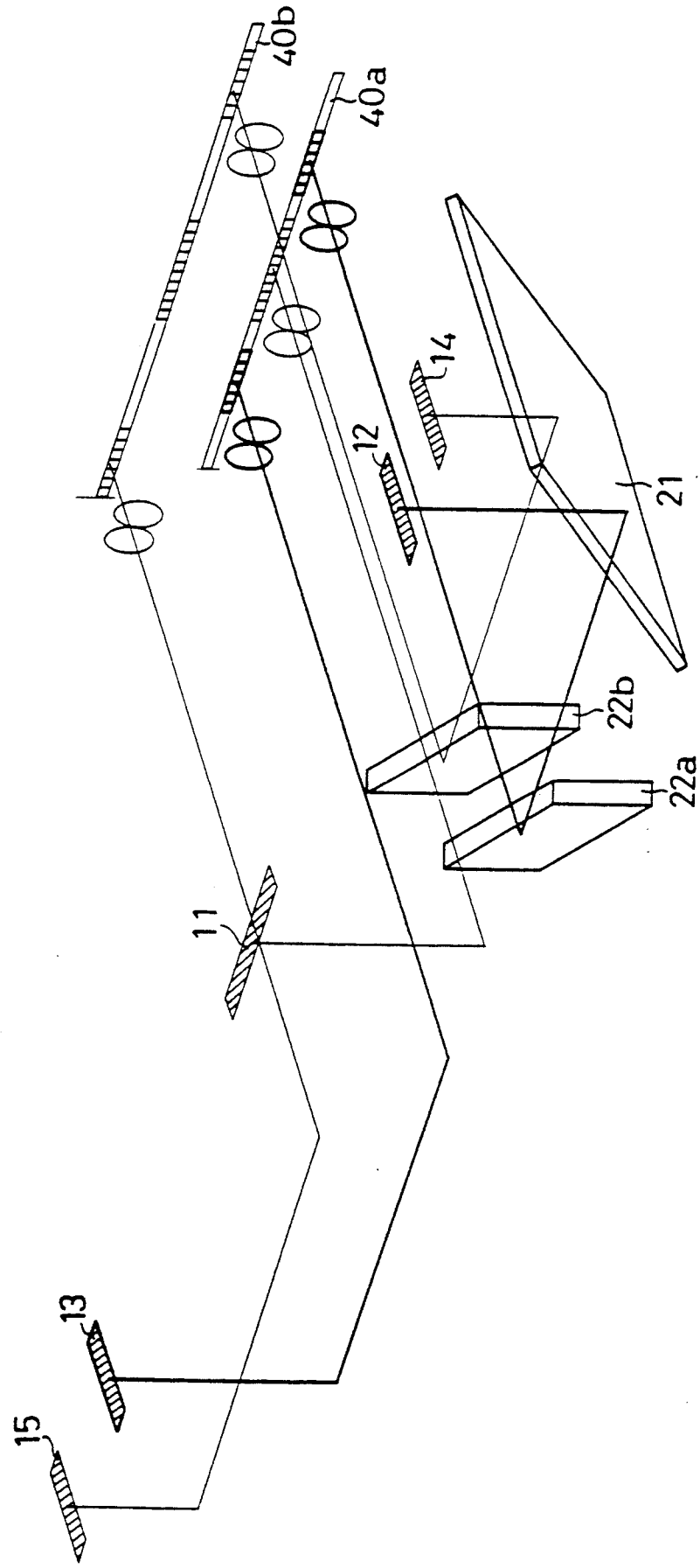
FIG. 24 is a perspective view showing the essential parts of a focus detecting apparatus according to a sixth embodiment of this invention.
Figure 25:
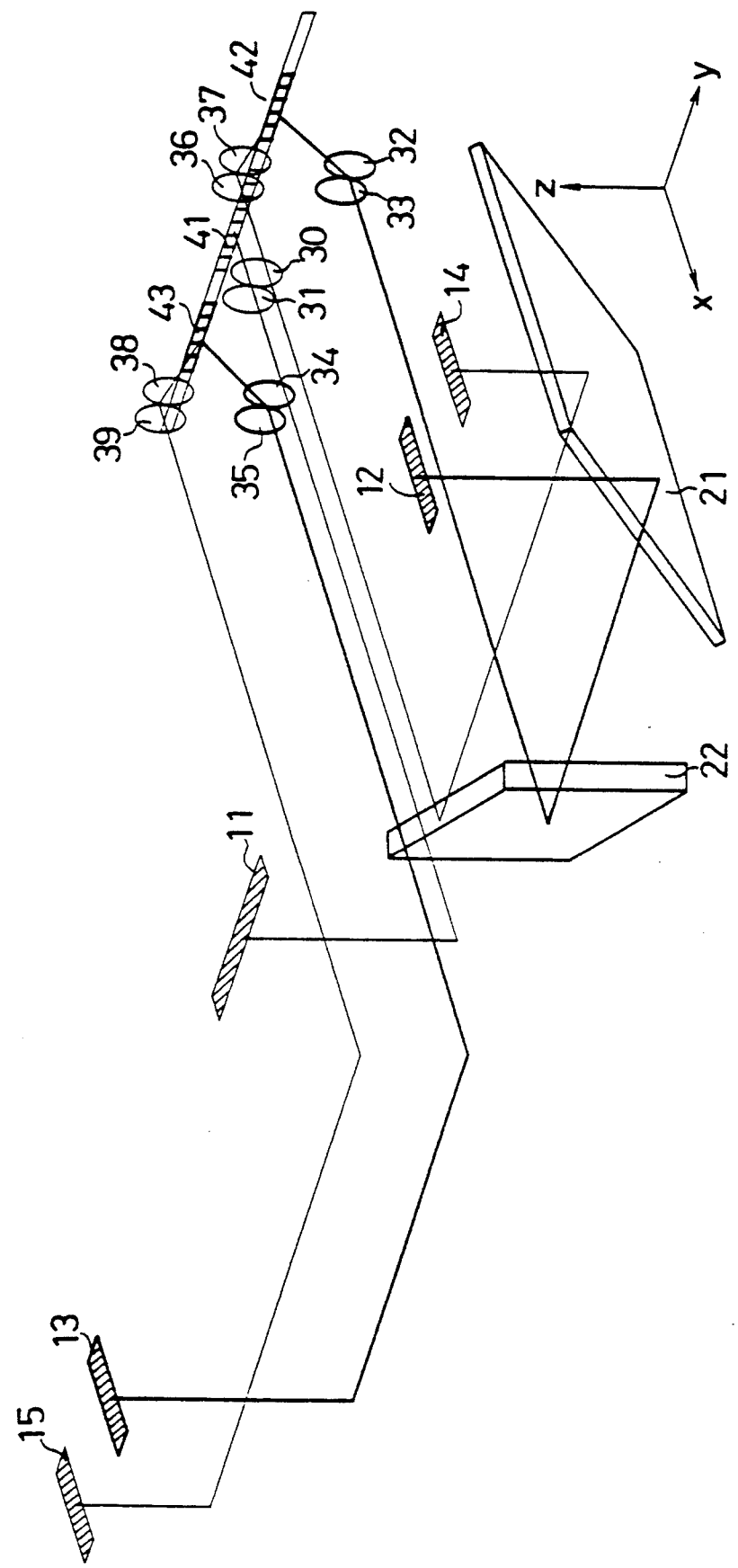
FIG. 25 is a perspective view showing the essential parts of a focus detecting apparatus according to a seventh embodiment of this invention.
Figure 26:
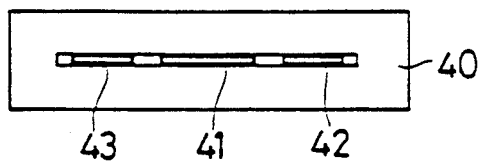
FIG. 26 is a plan view showing the arrangement of line sensors in a reimaging plane according to the seventh embodiment of this invention.

FIG. 24 shows a sixth embodiment of the focus detecting apparatus of this invention. In this embodiment, light beams from detecting zones 12, 14 on the periphery of the picture are both reflected by a second mirror 21, and reflected again respectively by third mirrors 22a and 22b so as to impinge on corresponding line sensors.

The remaining construction is the same as that of Embodiment 3 shown in FIG. 11.

Embodiment 7

FIGS. 25 to 28 show a seventh embodiment of the focus detecting apparatus of this invention. In this embodiment, light beams from five detecting zones 11 to 15 are made to impinge on a single line sensor group 40a.

The light beams from the detecting zones 12, 14 are separated by separating lenses 32, 33, 36 and 37 so as to impinge on a line sensor 42. Similarly, the light beams from the detecting zones 13 and 15 are separated by separating lenses 34, 35, 38 and 39 so as to impinge on a line sensor 43.

To deflect the light beams after they have passed through the separating lenses 32 to 39, a light beam deflecting means is required. Further, as focus detection cannot be performed if light beams from two detecting zones are received simultaneously on the common line sensor, means to obstruct one of the beams is also required.

Figure 27:
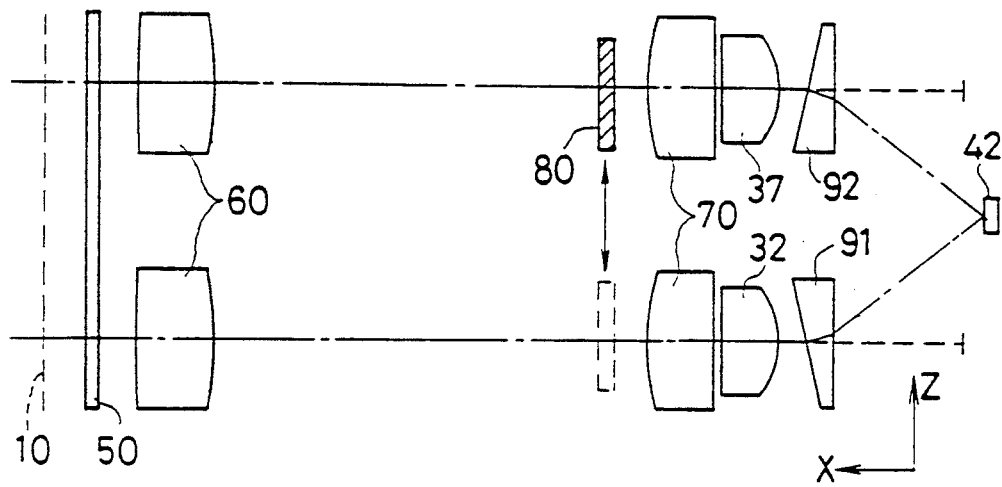
FIG. 27 is a schematic drawing showing one example of the detailed construction of the focus detecting apparatus according to the seventh embodiment of this invention.

FIG. 27 is a schematic drawing in the x-z plane illustrating an example of such an obstructing means and deflecting means. Behind the visual field mask 10, there are provided a cover glass 50 and condensing lenses 60. An opaque screen 80 which slides in the z direction so as to obstruct one of the light paths is provided between the condensing lenses 60 and the auxiliary lenses 70. A light beam which has passed through one of the auxiliary lenses 70 and either of the separating lenses 32, 37 then passes through either of prisms 91, 92 which act as deflecting means so as to impinge on the line sensor 42.

Figure 28:
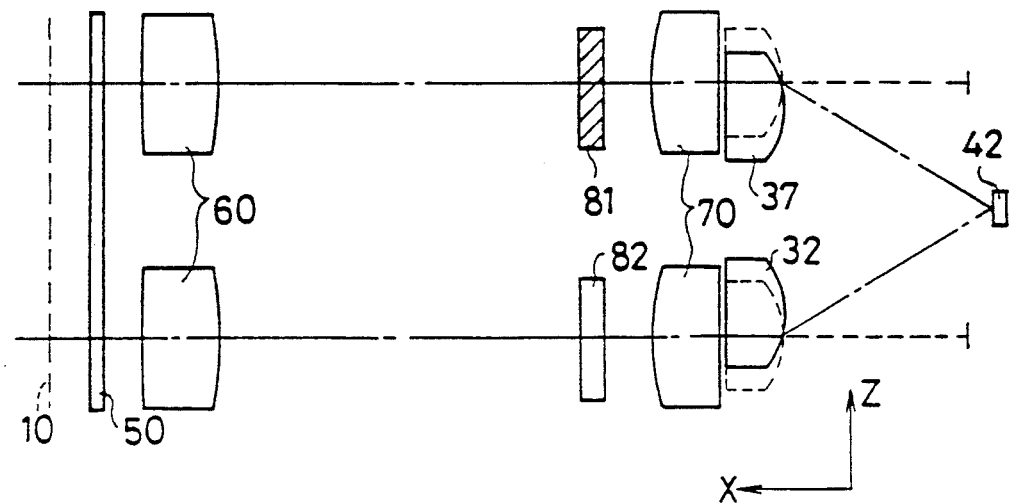
FIG. 28 is a schematic drawing showing a further example of the detailed construction of the focus detecting apparatus according to the seventh embodiment of this invention.

FIG. 28 shows another example of an obstructing means and deflecting means. In this example, liquid crystal shutters 81, 82 are installed in both light paths between the condensing lenses 60 and auxiliary lenses 70. These liquid crystal shutters are rendered either transparent or opaque by switching an applied voltage ON or OFF. In this example, one of the liquid crystal shutters is rendered transparent and the other is rendered opaque so as to select a light beam which impinges on the line sensor 42.

In the example of FIG. 28, the selecting lenses 32, 27 are decentered with respect to the optic axes of the light beams so as to cause the beams which have passed through the lenses to impinge on the line sensor 42.

Embodiment 8

Figure 29:
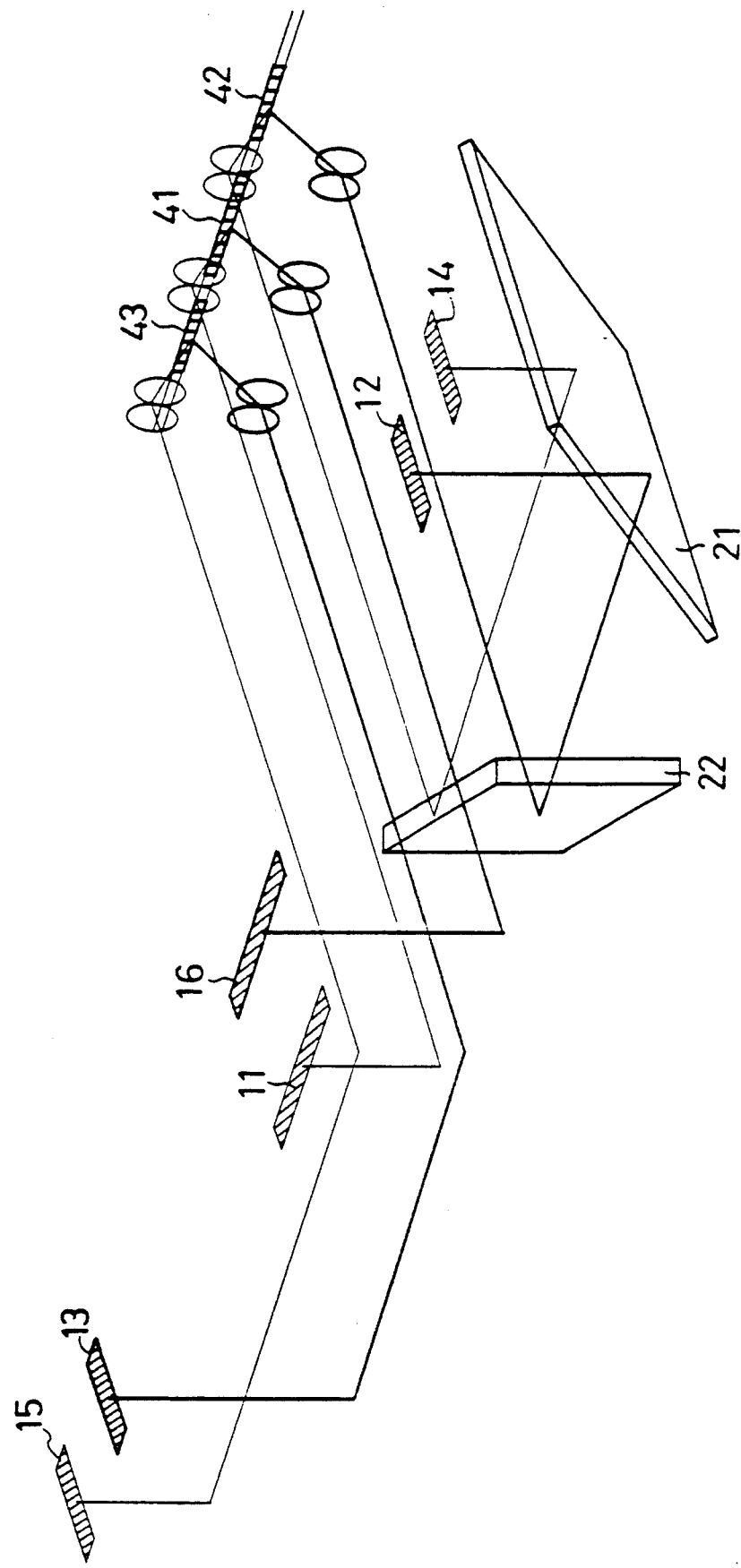
FIG. 29 is a perspective view showing the essential parts of a focus detecting apparatus according to an eighth embodiment of this invention.

FIG. 29 shows an eighth embodiment of the focus detecting apparatus of this invention. In this embodiment, six focus detecting zones 11 to 16 are provided on a visual field mask as in the example illustrated in FIG. 18. Light beams from detecting zones 11, 16 impinge on a line sensor 41. Light beams from detecting zones 12, 14 impinge on a line sensor 42, and light beams from detecting zones 13, 15 impinge on a line sensor 43. The remaining construction is the same as that of the preceding Embodiment 7.

Embodiment 9

Figure 30:
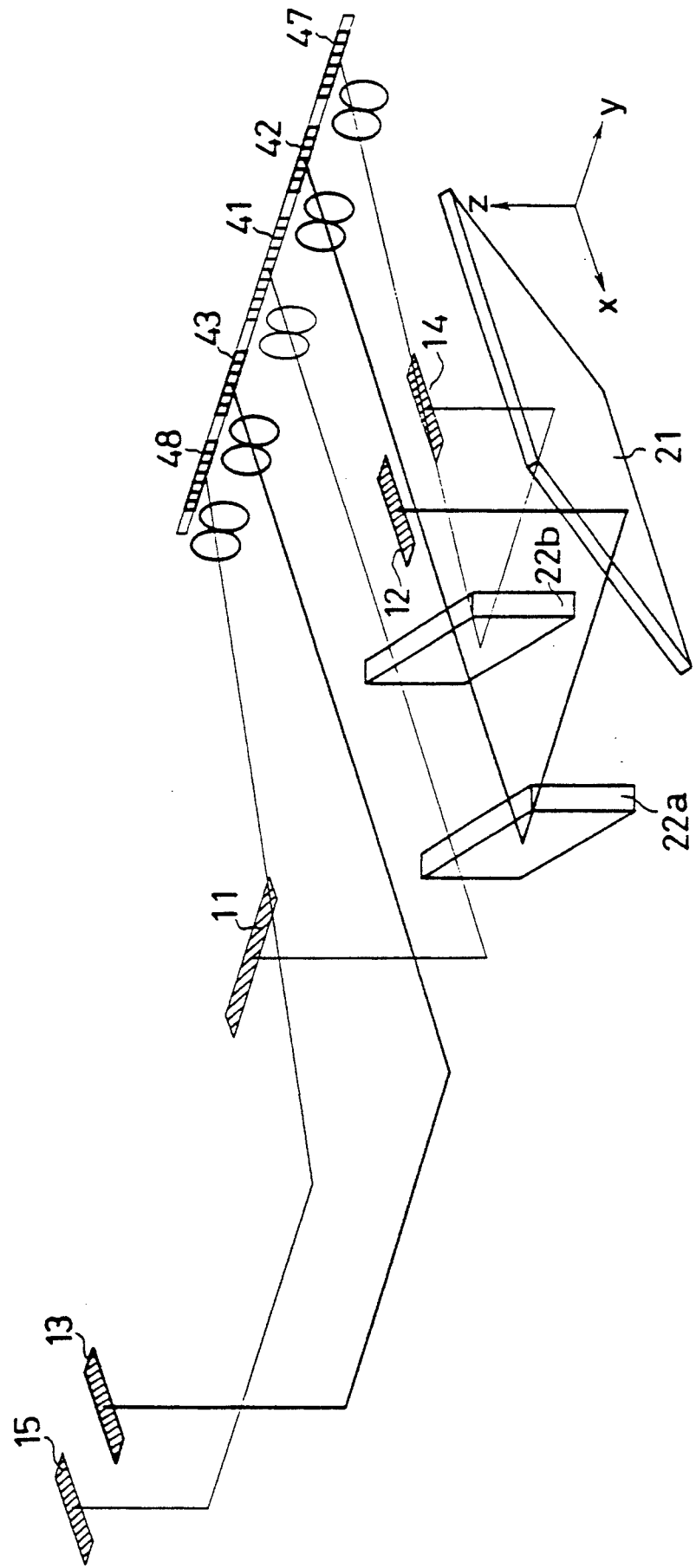
FIG. 30 is a perspective view showing the essential parts of a focus detecting apparatus according to a ninth embodiment of this invention.
Figure 31:
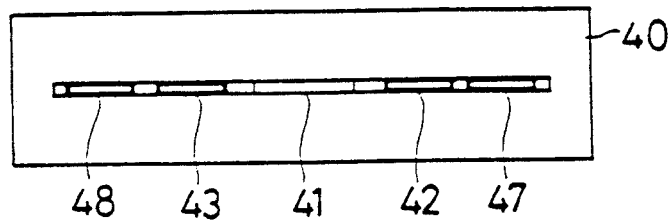
FIG. 31 is a plan view showing a arrangement of line sensors in a reimaging plane according to the ninth embodiment of this invention.

FIG. 30 shows a ninth embodiment of the focus detecting apparatus of this invention. In this embodiment, light beams from five detecting zones 11 to 15 are all made to impinge on line sensors 41 to 48 arranged in a straight line. FIG. 31 shows the arrangement of sensors in this embodiment.

The light beam incident from the detecting zone 12 is reflected by a second mirror 21 and a third mirror 22a so as to impinge on the line sensor 42. The light beam from the detecting zone 14 is reflected by the second mirror 21 and a third mirror 22b so as to impinge on the line sensor 47.

The third mirrors 22a and 22b are set at different angles in the x-y plane and x-z plane.

According to this embodiment, the light beams from all five detecting zones can be detected simultaneously by one line sensor.

What is claimed is:

1. A focus detecting apparatus, comprising:
    multiple detecting zones arranged in a first orientation configuration in a focal plane of a lens;
    means for changing an orientation of images formed in said multiple detecting zones;
    means for separating each image into an image pair; and
    a sensor unit having multiple line sensors arranged in a second orientation configuration that differs from said first configuration of said multiple detecting zones.

2. The focus detecting apparatus of claim 1, wherein at least one of said multiple detecting zones is arranged in a radial direction of said lens, the remaining multiple detecting zones being arranged in a sagittal direction.

3. The focus detecting apparatus of claim 2, wherein said orientation changing means comprises two mirrors which reflect images of said multiple detecting zones arranged in said radial or sagittal direction, and one mirror which reflects images of said multiple detecting zones arranged in the other of said radial and sagittal directions so that images of all of said multiple detecting zones are formed in a same direction on said sensor unit.

4. The focus detecting apparatus of claim 3, wherein said orientation changing means forms images of all of said multiple detecting zones in a straight line on said sensor unit.

5. The focus detecting apparatus of claim 3, wherein said orientation changing means forms images of all of said multiple detecting zones in two parallel straight lines on said sensor unit.

6. The focus detecting apparatus of claim 1, wherein said multiple detecting zones comprise a central zone that is situated on an optical axis of said lens, and peripheral zones that are situated on a periphery of said central zone.

7. The focus detecting apparatus of claim 1, wherein said separating means forms multiple detecting zone images on a same line sensor of said sensor unit, said apparatus further comprising means for obstructing which allows only one of said multiple detecting zone images to remain and obstructs light beams from all other multiple detecting zones.

8. The focus detecting apparatus of claim 1, wherein said multiple detecting zones comprise at least one center detecting zone and at least one peripheral detecting zone which are arranged in said first orientation configuration, said orientation changing means comprising a first mirror for deflecting an image formed in said at least one center detecting zone and second and third mirrors for deflecting an image formed in said at least one peripheral detecting zone.

9. A focus detecting apparatus, comprising:
    multiple detecting zones having a first orientation configuration arranged along a focal plane of a lens;
    a sensor unit having multiple line sensors;
    means for separating an image formed on each of said multiple detecting zones into an image pair;
    means for deflecting said image pair so that multiple image pairs are formed on one line sensor of said sensor unit; and
    obstructing means for passing only one of said multiple image pairs, while obstructing all remaining multiple image pairs of said multiple image pairs.

10. The focus detecting apparatus of claim 9, further comprising means for changing an orientation of images formed in said multiple detecting zones so that said multiple line sensors are arranged according to an orientation configuration that differs from said first orientation configuration.

11. The focus detecting apparatus of claim 9, wherein said deflecting means comprises a prism.

12. The focus detecting apparatus of claim 9, wherein said deflecting means comprises a lens which is off-center with respect to an optical axis of a light beam passing through said lens.

13. The focus detecting apparatus of claim 9, wherein said obstructing means comprises a liquid crystal shutter.

14. The focus detecting apparatus of claim 9, wherein said obstructing means comprises an opaque screen.

15. A focus detecting apparatus, comprising:
    multiple detecting zones having a first orientation configuration arranged along a focal plane of a lens;
    means for changing an orientation of images formed in said multiple detecting zones;

means for separating each image into an image pair; and a sensor unit having multiple line sensors arranged in a second orientation configuration that differs from said first orientation configuration, wherein said orientation changing means comprises a mirror which reflects images of said multiple detecting zones so that images of all of said multiple detecting zones are formed in one direction on said sensor unit.

16. The focus detecting apparatus of claim 15, wherein said orientation changing means forms images of all of said multiple detecting zones in a straight line on said sensor unit.

17. The focus detecting apparatus of claim 15, wherein said orientation changing means forms images of all of said multiple detecting zones in two parallel straight lines on said sensor unit.

18. A focus detecting apparatus, comprising:
a detector having a plurality of detecting zones arranged according to a first orientation configuration;
a deflector that changes an orientation of an image formed in said plurality of detecting zones;
means for separating said light ray into an image pair; and
a sensor having a plurality of line sensors arranged according to a second orientation configuration that differs from said first configuration.

19. A focus detecting apparatus, comprising:
multiple detecting zones arranged in a first two-dimensional configuration in a focal plane of a lens;
means for separating each image formed in said multiple detecting zones into an image pair;
a sensor unit having a plurality of sensors arranged in a second two-dimensional configuration, that differs from said first two-dimensional configuration; and
means for configuring each of said images so as to conform to said second two dimensional configuration.

20. The focus detecting apparatus according to claim 19, said means for separating comprising separating lenses of different focal lengths.

21. The focus detecting apparatus according to claim 19, said means for separating comprising a one-piece construction including a plurality of individual lenses.

22. The focus detecting apparatus according to claim 19, said multiple detecting zones comprising a central detecting zone not intersecting an optical axis of the lens.

23. The focus detecting apparatus according to claim 19, said configuration changing means comprising a mirror.

24. the focus detecting apparatus according to claim 19, said configuration changing means comprising a prism.

25. A focus detecting apparatus, comprising:
multiple detecting zones arranged in a first configuration in a focal plane of a lens;
a sensor unit having a plurality of sensor areas arranged in a second configuration that differs from said first configuration; and
means for changing the configuration of images formed in said multiple detecting zones so as to conform to said second configuration.

26. A focus detecting apparatus according to claim 25, wherein said first configuration defines an orientation of said multiple detecting zones and said second configuration defines an orientation of said plurality of sensor areas.

27. The focus detecting apparatus according to claim 25, further comprising means for separating each image formed by said multiple detecting zones into an image pair.

28. The focus detecting apparatus according to claim 25, each of said plurality of sensor areas comprising a line sensor.

29. The focus detecting apparatus according to claim 28, wherein said line sensors are arranged independently of the arrangement of said multiple detecting zones in a focal plane.

30. The focus detecting apparatus according to claim 25, wherein two peripheral detecting zones are oriented parallel to the sagittal direction of the lens and perpendicular to a longitudinal direction of a central detecting zone.

31. The focus detecting apparatus according to claim 25, said plurality of sensors being arranged in a straight line.

32. The focus detecting apparatus according to claim 25, said sensor unit comprising a single sensor having regions corresponding to said detecting zones.

* * * * *

UNITED STATES PATENT AND TRADEMARK OFFICE
CERTIFICATE OF CORRECTION

PATENT NO. : 5,321,248
DATED : June 14, 1994
INVENTOR(S) : Takayuki SENSUI

It is certified that error appears in the above-indentified patent and that said Letters Patent is hereby corrected as shown below:

On page 2 of the cover sheet, section [56], lines 3 and 4 under Other Publications, delete, "nique, Optical Engineering, Jul./Aug. 1974, pp. 339-342."

On page 2 of the cover sheet, section [56], line 17 under Other Publications, insert, ---nique, Optical Engineering, Jul./Aug. 1974, pp. 339-342.---

Signed and Sealed this

Fifth Day of September, 1995

*Attest:*

BRUCE LEHMAN

*Attesting Officer*

*Commissioner of Patents and Trademarks*